United States Patent Office 3,027,291
Patented Mar. 27, 1962

3,027,291
COMPOSITION AND METHOD OF PREVENTING ADHESION
James L. Foster, Frank L. Laymon, and Clyde B. Myers, Painesville, Ohio, assignors to Diamond Alkali Company, Cleveland, Ohio, a corporation of Delaware
No Drawing. Filed Sept. 9, 1957, Ser. No. 682,603
26 Claims. (Cl. 156—289)

This invention relates to an aqueous adhesive silicate composition characterized by a high degree of adhesiveness to cellulosic materials while being substantially non-adhesive to heated metal surfaces, to compositions and processes for imparting and improving non-adhesion of aqueous silicate adhesive compositions to heated metal surfaces, and to improvements in the preparation of paperboard via the use of such adhesives and compositions.

In the manufacture of laminated and corrugated paperboard, which term "paperboard" is used throughout the specification and claims to refer to the corrugated material known as boxboard or paperboard comprising at least one planar cellulosic liner bonded to a corrugated cellulosic element via the tips of the flutes of the corrugated element. The operations involved in preparing paperboard generally comprise forming a corrugated element by passing a cellulosic sheet between corrugating rolls and while the sheet is still engaged in the rolls, applying an adhesive to the tips of the thus-formed flutes. Thereafter, a noncorrugated or planar cellulosic liner is applied against the adhesive-coated flutes of the corrugated element as the corrugated sheet passes between the corrugating roll and a pressure roll. The resulting "single-faced" element may then be used as such in certain applications, but more commonly there is subsequently applied to the exposed corrugated side of the single-faced element in a so-called "double backing" operation wherein adhesive is applied to the still exposed tips of the flutes and a second liner sheet is applied thereagainst. The thus-formed structure is passed through a so-called "hot plate" dryer section where it is heated between a continuously moving belt and a hot plate or platen surface to dehydrate the adhesive and establish an adhesive bond, the assembled structure being held in smooth contact with the hot plate by steel idling rolls riding on top of the continuously moving belt.

Referring more specifically to the various operations involved in forming paperboard, the initial bonding of a corrugated element to a liner is generally termed "single facing" and comprises adhering a corrugated cellulosic element to a flat cellulosic liner thereby to form a 2-ply structure permitting free bending in one direction. Such a product is known as a "single-faced" board and is typically used as such in wrapping and cushioning. In the formation of the adhesive bond in a single-facing operation, only a very short time is available for cementing the corrugated element to the flat liner as the corrugated roll and the pressure roll momentarily slam the sheets into position and apply heat and pressure to the situs of the desired adhesive bond. Typical contact times in which the adhesive bond must be formed in a single-facing operation are of the order of about $\frac{1}{50}$ to $\frac{1}{100}$ of a second. In order to form a satisfactory adhesive bond in the short time available, it is generally the practice to apply as high a pressure as possible and to operate at a relatively high temperature, the latter typically varying between about 300° and 500° F., or more, usually between 340° and 400° F. In practice, the cellulosic materials being glued frequently have a lineal speed in the range of about 300 to 500 ft. per minute so that it will be appreciated that only a small time is available for forming the desired adhesive bonds.

The other principal operation referred to hereinbefore in forming paperboard is that of applying a second liner sheet to a single-faced corrugated element. In this operation, which generally is termed "double-facing" and is accomplished in a so-called "double facer" or "double backer," a previously-formed, single-faced corrugated structure comprising a flat cellulosic sheet super-imposed on, and bonded to, a corrugated, cellulosic element is provided with the second liner sheet bonded to the exposed flutes of the single-faced corrugated element.

The double-facing or double-backing process can be repeated as desired to form a so-called "double-walled" board comprising two flat liners and two corrugated members bonded to a third flat liner therebetween, or a so-called "triple-wall" board comprising four flat liners and three corrugated elements sandwich-style therebetween having the same or different flute heights, e.g., so-called "A," "B" or "C" flutes therebetween.

In forming the double-faced board in the double-backer, the problems encountered with respect to adhesive bonding are somewhat different from those involved in single-facing operations in that a longer time is available for forming the adhesive bond, typically from about 5 to 20 seconds. Also, somewhat lower machine temperatures are encountered, typical hot plate temperatures in a double-backer being about 300° to 350° F.

Difficulties in the manufacture of paperboard arise when aqueous adhesive silicate compositions come in contact with the corrugating, pressure and idling rolls, platens of the hot plate dryers and other apparatus, undesirably forming glasslike, hard deposits thereon, thus fouling the rolls and hot plate sections and necessitating an interruption in production to remove the deposits. Further, as the laminated cellulosic structure passes between the belts and the platens of the hot plate section, some of the adhesive silicate composition frequently exudes from the portions of the laminate nearest the edges thereof, and is deposited upon the heated metal surfaces of the platens. After a relatively short time, these deposits of exuded silicate adhesive accumulate on the surface of the platens and other heated metal surfaces and build up into ridges or mounds near the edges of the moving laminated web and under the influence of the relatively intense heat are dehydrated to a hard, strongly adherent, solid silicate. Such hard deposits are then in a position to destroy the edges of the moving laminated structure passing across the heated surfaces.

Moreover, as the production of paperboard of lesser and greater widths may be scheduled alternately on the equipment during a given production period, the changeover from the lesser to the greater width may leave hard, adherent silicate deposits of the dehydrated adhesive in position to mar substantial areas of the wider paperboard formed on such equipment. When the accumulation of the deposits of dehydrated silicate is sufficient to cause a destruction of substantial areas of the wider, laminated web passing thereover, the entire operation must be interrupted and the heated metal surfaces cleaned before the further production of such wider widths may be undertaken. A major difficulty in the cleaning operation arises in the fact that the dehydrated silicate adheres quite strongly to the heated metal surfaces, requiring considerable time and hand labor to dislodge the deposit and refinish the surface. Accordingly, despite the many advantages of silicate adhesives, including, of course, a high degree of adhesion to cellulosic materials, one of the problems limiting their application heretofore has been this undesirable adhesion to heated metal surfaces.

Accordingly, the principal object of this invention is to avoid the difficulties heretofore encountered with the undesired adhesion of silicate adhesives to heated metal surfaces in paperboard manufacturing apparatus.

Another object of the invention is to provide compositions and methods for decreasing the adhesion of an aqueous adhesive silicate composition to heated metal surfaces generally.

A further object of the invention is to provide methods and compositions for preventing the adhesion of aqueous adhesive silicate compositions to heated metal surfaces of paperboard-forming apparatus.

A still further object of the invention is to provide a new and improved method of reducing adhesion of paperboard manufacturing adhesives to heated metal surfaces of the paperboard manufacturing apparatus.

A still further object of the invention is the provision of compositions to reduce adhesion of alkali metal silicates to heated metal surfaces.

In paperboard manufacturing operations, the speed at which the paperboard manufacturing apparatus can be operated is directly related to the time required to develop a satisfactory adhesive bond between the several cellulosic elements. Further, it is desirable to reduce the heating time required as much as possible. Accordingly, it is a still further object of this invention to provide new and improved silicate adhesives which not only have the aforementioned desirable characteristics but which also permit greater speed of operation of paperboard manufacturing equipment.

Broadly, the present invention resides in the manufacture of paperboard, and in materials for the preparation of paperboard, by adhesively bonding with an aqueous alkali metal silicate adhesive cellulosic material at an elevated temperature wherein the heated metal surfaces of the apparatus coming in contact with the cellulosic materials or adhesives used therewith are contacted with a substance which per se aids self-release from heated metal surfaces of dried alkali metal silicates and which meets several other critical requirements including (1) being soluble in petroleum-derived oils when used in admixture with such oils, (2) not adversely affecting viscosity of adhesive compositions containing such additive, (3) noncorrosive, (4) not affecting lubricity of oil containing such additive, (5) not having or imparting undesirable odor, (6) nontoxic, and not impairing the coefficient of friction of treated surface. The presently preferred additive meeting these requirements is a silicone disposed at the interface of the dried adhesive deposit and metal to facilitate nonadhesion of the adhesive to the heated metal surfaces.

More specifically, the practice of this invention contemplates that the silicone can be (I) applied directly to the heated metal surfaces coming in contact with cellulosic liners or adhesive during the manufacture of paperboard, (II) a polysiloxane incorporated in the aqueous alkali metal silicate adhesive itself as a part of the adhesive composition, or (III) applied directly to the heated metal surfaces and a polysiloxane incorporated into the alkali metal silicate adhesive used in forming paperboard.

DEFINITION OF SILICONE

The term "silicone" as employed throughout the specification and claims is intended unless otherwise indicated to refer to organo silicon compounds including both (1) silanes, i.e., compounds of the structure: $(R)_m SiX_{4-m}$ wherein X is halogen and R is selected from the group consisting of alkyl radicals, e.g., methyl, ethyl, propyl, butyl, isomers thereof, and the like; aryl radicals such as phenyl or naphthyl radicals; alkaryl radicals, e.g., tolyl or xylyl radicals; and aralkyl radicals, such as benzyl or phenethyl radicals, and (2) polysiloxanes as described hereinafter in some detail.

Illustrative silanes are mono, di and tri phenyl chloro silane, e.g., phenyl trichlorosilane, mono, di and tri alkyl chlorosilanes, e.g., ethyl trichlorosilane, dimethyl dichlorosilane, diethyl dichlorosilane, methyl trichlorosilane, and the like. It will be appreciated, of course, that in defining X as a halogen in the above formula it is contemplated that X may be chlorine, fluorine, bromine or iodine although chlorine is preferred. Hence, it will be understood that corresponding halo-substituted silanes other than chlorine-containing silanes also are contemplated.

The polysiloxanes are cross-linked polymers containing a multiplicity of siloxane (—Si—O—Si—) groups with alkyl and alkoxy substituents on the silicon atoms. It will be appreciated that silanes constitute intermediates in the preparations of polysiloxanes.

A preferred type of silicone is alkyl alkoxy polysiloxane resin which can be prepared by reacting an alkyl halosilane, notably an alkyl trichlorosilane with a carbinol, preferably a lower alkanol such as methanol, ethanol, propanol, butanol, or the like, and thereafter hydrolyzing and at least partially condensing the resultant material to obtain a liquid polymeric material, which can be fully condensed if desired in a subsequent curing treatment.

In general, however, alkyl alkoxy siloxanes as employed in the practice of the present invention can and preferably do consist of alkyl polyalkoxy siloxanes, especially alkyl trialkoxy siloxanes, preferably alkyl triethoxy siloxanes wherein the alkyl group is selected from those hydrocarbon radicals which impart a degree of water repellency to the resultant silicone material, typically practicable alkyl groups being lower alkyl radicals such as butyl, amyl, hexyl, heptyl and octyl radicals; the trialkoxy group can include methoxy, ethoxy, propoxy and the like groups which lead to liquid silicone resins upon hydrolysis and condensation. The preferred alkyl group is amyl, and the preferred trialkoxy group is triethoxy.

A specific paraffin oil-soluble silicone resin especially suited for the practice of the present invention and which imparts advantageous results to adhesive silicate compositions by way of self-releasing properties is a liquid polysiloxane resin, i.e., normally liquid at room temperature, obtained by the hydrolysis and partial condensation of amyltriethoxy silane. Such a resin is prepared by controlling the hydrolysis and condensation reaction or amyltriethoxy silane to obtain a liquid resin which can subsequently be cured, for example, with a catalyst such as stannous chloride, because of the presence of unreacted ethoxy and/or silanol groups in the resin.

This preferred polysiloxane has the following general structure:

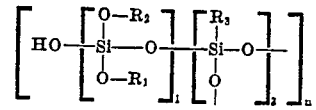

wherein $R_1$ and $R_2$ are the same or different lower alkyl radicals such as methyl or ethyl, $R_3$ is an alkyl group, or mixture of alkyl groups, each containing from 2 to 18 carbon atoms, inclusive, and $n$ is a number sufficient to provide an average molecular weight less than about 3000.

The specific presently preferred polysiloxane is amylethoxy polysiloxane of the following structure:

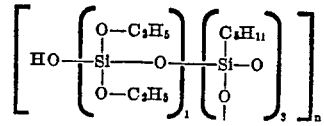

wherein $n$ is a number sufficient to provide an average molecular weight of less than 3000.

I. APPLICATION OF SILICONE DIRECTLY TO HEATED METAL SURFACES

Considering now the application of a silicone directly to heated metal surfaces, the compositions of this invention for such application generally comprise an oil-soluble or emulsifiable silicone, e.g., either a polysiloxane, a silane or mixture thereof, either as such, or as a minor ingredient, i.e., up to about 10% by weight, together with a major proportion of a "carrier," which term is intended broadly to include finely-divided materials, both liquid and solid, preferably liquid, i.e., solvents, diluents, extenders, or the like, including water and various organic liquids, especially fire-resistant, high specific gravity chlorinated solvents such as tetrachlorethylene, trichlorethylene, ethylene dichloride, carbon tetrachloride, and the like, as well as various paraffin base oils comprising distillation products of crude oil.

A. Corrugator Roll Coatings

Since conventional paperboard manufacturing operations typically include the step of spraying or misting such oils on the heated metal surfaces, especially the corrugator rolls, of paperboard manufacturing apparatus as a means of lubrication, it will be appreciated that the practice of the present invention very readily and advantageously can be embodied into conventional paperboard manufacturing operations without modification of the usual operating techniques but with a singular improvement in results. Illustrative of suitable oils are petroleum oils having viscosities within the range from about 10 to 100 centipoises at 20° C. Illustrative commercially available oils are Sunoco DTE Light and No. 3602 Paradol Medium (American Oil Co.), viscosity 42.6 centipoises at 20° C. as measured with a Brookfield viscosimeter (Model LVF). It will be understood, thus, that a preferred composition of this embodiment of the invention comprises a major proportion of a petroleum-derived oil and a minor amount up to about 10% by weight of the oil, preferably about 1% to 5% of an oil-soluble silicone.

B. Coatings for Hot Plate (Platen)

Considering specifically the practice of the present invention as applied to the platens of paperboard manufacturing apparatus, the silicone may be either a siloxane or a silane and may be applied as such or in a composition which includes a carrier such as water or an organic liquid such as kerosene, tetrachlorethylene or Cellusolve. In such an application, unlike that to the corrugator rolls, no lubrication need be imparted by the composition. An illustrative commercially available silicone is the product known as XE-23 emulsion (Silicones Division, Union Carbide).

An advantageous means for applying a silicone to heated metal surfaces comprises embodying such silicone in an aqueous emulsion consisting essentially of water, about 1% to 10% of silicone and a minor amount, e.g., up to about 1%, preferably about 0.01 to 0.1% of a surface active agent. Illustrative wetting agents are Span 20 (sorbitan monolaurate), Tween 20 (polyoxyethylene sorbitan monolaurate), Ultrawet DS (alkyl benzene sodium sulfonate, e.g., sodium dodecyl benzene sulfonate), or the like.

In addition, silicone-containing compositions for application directly to the heated metal surfaces in either of the foregoing ways advantageously can contain a small amount of finely-divided graphite, preferably a colloidal graphite such as the commercially available material known as "Aquadag," which is a dispersion of colloidal graphite in water. In order to facilitate the formation of a film or coating on the heated metal surfaces, it may be desirable in some applications also to incorporate a small amount of a catalyst, such as stannous chloride, or other suitable catalyst, with the silicone to implement curing of the silicone in situ on the heated metal surfaces.

In the application of a silicone to heated metal surfaces such as the platens, corrugating rolls, idling rolls, and the like, the desired silicone coating may be accomplished by rubbing, swabbing, spraying, fogging, and the like, with a silicone-containing solution, emulsion, suspension, dispersion or the like, subsequent heating typically by the normally-encountered heat of the heated metal surfaces to obtain a smooth and continuous coating of the silicone-containing composition on the heated metal surfaces. By such practice, it has been found that paperboard can be prepared employing a conventional or an unmodified silicate adhesive, or, preferably, employing an aqueous silicate adhesive composition of this invention described in some detail hereinafter, and the deposits exuded on heated metal surfaces from any silicate adhesive used are easily dislodged or self-releasing wherein substantially no damage results to the paperboard material being treated or being formed, while the high degree of non-adhesion to heated metal surfaces does not impair the excellent adhesion to cellulosic materials.

More specifically, another advantageous composition of this invention for coating of heated metal surfaces in the manufacture of paperboard, comprises mixture of a silicone with a liquid wetting agent, e.g., about 80 parts of amyltriethoxysilane with about 20 parts of Igepal CO-530 (liquid, oil-soluble reaction product of about 4-30 mols of ethylene oxide per mol of alkyl phenol). As indicated hereinbefore, since it is conventional to apply to the heated metal surfaces of the paperboard manufacturing equipment, e.g., the corrugating rolls, idling rolls, hot plate, heated platens and the like, a continuous mist or spray of a hydrocarbon oil such as a low viscosity paraffin-base hydrocarbon lubricating oil or other suitable oil, a highly advantageous embodiment of the present invention comprises incorporating into such an oil a minor amount of such a silicone either as such or in the form of an emulsion compatible with such oil, e.g., up to 10% by weight silicone or silicone-containing mixture in a petroleum oil.

II. INCORPORATION OF SILICONE INTO SILICATE ADHESIVE

Considering now silicate adhesive compositions of this invention which advantageously may be used in combination with the procedure of coating the heated metal surfaces with a silicone containing material separately or, in many instances, without coating such heated metal surfaces with a silicone-containing composition, the term "alkali metal silicate" is intended to refer to silicates of the various alkali metals, i.e., sodium, potassium, lithium, rubidium and cesium, although silicates of potassium and sodium are more generally available and because of their lower cost and availability, sodium silicates are more widely used and therefore are preferred in the practice of the present invention.

A silicate adhesive composition embodying the present invention thus comprises the combination of an alkali metal silicate and a small amount of a silicone stable to aqueous alkali solutions. Hence, one embodiment of an adhesive of the present invention comprises a mixture of a major proportion of an alkali metal silicate and a minor amount, typically up to about 1% by weight of a polysiloxane, the upper limit on concentration of the polysiloxane being that at which there occurs a failure of adhesive penetration into the material to be bonded. Silanes which are not stable in aqueous alkaline solutions are not advantageously employed.

More specifically, an aqueous silicate adhesive composition of this invention comprises, in combination, a small amount of a polysiloxane, an aqueous alkali metal silicate, especially one having an alkali metal oxide:silicon dioxide ratio within the range from about 1.0:2.5–4.0, notably, sodium silicate, having an $Na_2O:SiO_2$ ratio within the range from about 1:2.5 to 4.0. A preferred range is 1Na₂O to about 3 to 3.5SiO₂, the specifically preferred ratio being about 1Na₂O:3.3SiO₂, and minor amounts of clay and urea. In addition, the composition also desirably may contain one or more substances selected from the group consisting of fatty oils, alkanolamines, Piccopale resins, alkali metal bichromate and organic wetting agents. In addition, in order to obtain a predetermined viscosity, a small amount of water may be added. Silicate adhesive compositions of this invention are set forth, together with desired proportions even more specifically in the following table:

| Ingredient | Percent by Weight | Preferred Compositions | |
|---|---|---|---|
| | | Ingredient | Percent By Wgt. |
| Aqueous alkali metal silicate (alkali metal oxide:SiO₂ molar ratio of 1.0:2.5 to 4.0). | At least 50%. | Sodium silicate (Na₂O:SiO₂ 1:3.3 to 3.5) (Solids 35 to 47%). | 70-85 |
| Alkali-Stable Silicone Resin. | Up to 1.0 | (Polysiloxane) Amyl ethoxy polysiloxane. | 0.04-0.1 |
| Clay | 0-20 | Barden Clay | 8-14 |
| Urea | 0-8 | Urea | 3-6 |
| Fatty Oil | 0-2 | Cottonseed oil | 0.1-1.0 |
| Alkylolamine | 0-3 | Triethanolamine | 0.1-1.0 |
| Piccopale Resin | 0-2.0 | Piccopale 100 | 0.27-0.75 |
| Alkali metal chromate | 0-1.0 | Sodium bichromate | 0-1.0 |
| Organic Wetting Agent. | 0-1 | Igepal CO-530 (liquid). | 0-0.5 |
| Water (added) | 0-10 | Water (added) | 5-8 |

Referring to the foregoing table, the terms "alkali metal silicate" and "silicone" have been previously described and the prior definitions are intended in the above table also.

The term "clay" as employed in the specification and claims and in the practice of this invention is intended generally to refer to a non-swelling kaolin type clay, generally indicated as consisting essentially of

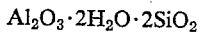

$$Al_2O_3 \cdot 2H_2O \cdot 2SiO_2$$

Suitable commercially-available clays are those available from natural quarries in South Carolina or Georgia. More specifically, the clay perferably is finely-divided, i.e., predominantly aluminum silicate materials of an average particle size of about 2 microns of which Barden clay is an example. It will be understood, of course, that the particle size of the clay can be varied.

The term "fatty oil" as employed throughout the specification and claims is intended to include vegetable oils which are normally liquid at room temperature, although corresponding animal oils also are useful in certain applications. Suitable illustrative fatty oils are cottonseed, peanut, menhaden, soybean, coconut, lard, corn, sesame, and the like. Cottonseed oil at present is preferred.

The alkanolamine generally may be any lower mono-, di- or trialkanolamine such as mono-, di- and/or tri- methanolamine, ethanolamine, propanolamine, or the like, triethanolamine being preferred at present.

The term "Piccopale resin" is a trade name of a series of organic compounds prepared by the Pennsylvania Industrial Chemical Corporation and comprises several resins distinguished largely by difference in softening or melting points. In the practice of this invention such materials which are polymerized petroleum hydrocarbon resins having softening points from about 60°–150° C. are suitable; purely specifically preferred material is resin known as "Piccopale 100" which is a polymerized petroleum hydrocarbon resin made up of methylated paraffin chains having limited unsaturation and softening at about 100° C. More specifically, "Piccopale 100" can be characterized as the polymerization product obtained by catalytically reacting in a carefully controlled condition a mixture of monomers having an average molecular weight of approximately 90 and composed essentially of dienes and reactive olefins to produce a hard, solid, resin with a resulting average molecular weight of about 1100. Piccopale 100 has the following properties.

Physical:
    Form _____ Thermoplastic solid.
    Softening point, ball and ring _ 100±3° C.
    Specific gravity @ 25/25° C. _ .970–.975.
    Pounds per gallon _____ 8.12.
    Color:
        Coal tar scale _____ 2½ max.
        Rosin scale _____ F.
        Gardner scale _____ 13.
    Flash point, C.O.C. _____ 500° F.
    Fire point _____ 520° F.
    Refractive index @ 20° C. ___ 1.5116.
Chemical:
    Acid number _____ Less than 1.
    Saponification No. _____ Less than 2.
    Ash _____ 0.2% max.
    Iodine value (Wijs) _____ 120.
    Iodine value (corrected for substitution _____ 30.
    Bromine number _____ 7.3.
    Molecular weight _____ 1100.
    Double bonds per mol. (bromine number) _____ 1.
    Hydrogen absorption (Adams catalyst _____ Practically nil.

The expression "alkali metal chromate" is intended to include both chromates and bichromates of the several alkali metals, i.e., sodium, potassium, lithium, rubidium, and cesium; sodium bichromate is presently preferred.

The term "organic wetting agent" is intended to include both nonionic and anionic wetting agents, specific illustrative examples of which are alkyl sulphates, aromatic monosodium sulfonates derived from petroleum oils, alkyl aryl sulfonates, coconut oil sulfonates, turkey red oil, which is a sodium salt of a sulfonated castor oil, Igepal CO–530 (alkyl phenoxy polyoxyethylene ethanol) generally prepared by condensing about 4–30 mols of ethylene oxide:one mol of an alkylphenol, sodium sulfonate of petroleum hydrocarbon ($C_{16}$), i.e., sodium dodecyl benzene sulfonate, which typically is available commercially as a product containing 60% of sodium dodecyl benzene sulfonate and 40% of sodium sulfate.

In the foregoing table the amount of water specified is in addition to any water normally contained in the aqueous silicate itself which is indicated by the solids content specified. In some instances, it is not necessary to add any water, but generally, addition of a controlled amount of water is desirable to provide a predetermined solids content and thereby regulate the viscosity depending on the intended specific application in the manufacture of paperboard. For example, in single-facing operations it is desirable to have a viscosity not greater than about four poises, preferably 2.0 to 4.0 poises, and even more preferably, 3.0 to 3.5 poises. On the other hand, in double-backing operations it is desired to have an adhesive viscosity of at least 4 poises, desirably within the range from about 4.0 to 8.0 poises, and preferably 5.5 to 6.0 poises, these viscosity determinations measured at 20° C. by a Brookfield viscosimeter (Model LVF) a product of Brookfield Engineering Laboratories, Stoughton, Massachusetts.

In order that those skilled in the art may more completely understood the present invention and the preferred methods by which the same may be carried into effect, the following specific examples are offered:

EXAMPLE I

An illustrative adhesive composition of this invention is as follows:

| | Percent by wgt. |
|---|---|
| Sodium silicate solution (40.8° Bé. 37.7–8% solids) ($Na_2O:SiO_2$ ratio=1:3.3) | 78.65 |
| Barden clay | 9.0 |
| Urea | 4.5 |
| Water | 7.5 |
| Piccopale Resin 100 | 0.3 |
| Silicone [1] | 0.05 |
| | 100.00 |

[1] 80 parts amylethoxy polysiloxane, 20 parts Igepal CO-530.

EXAMPLE II

A further illustrative composition is one identical with the foregoing example except that 0.01% of Ultrawet DS (sodium dodecyl benzene sulfonate) is incorporated, the quantity of the silicate being reduced accordingly.

EXAMPLE III

A still further exemplary composition is one identical with the foregoing except that 0.3% of sodium bichromate is added, the quantity of silicate being reduced accordingly.

EXAMPLE IV

Another adhesive composition of this invention is as follows:

| | Percent |
|---|---|
| Sodium silicate solution (40.8° Bé. 37.7–8% solids) ($Na_2O:SiO_2$ ratio=1:3.3) | 77.39–79.44 |
| Clay | 9.0 |
| Urea | 4.0 – 6.0 |
| Silicone | 0.05– 0.1 |
| Igepal CO-530 | 0.01 |
| Water | 7.5 |

EXAMPLE V

Another adhesive composition embodying the invention is the following:

| | Percent by wgt. |
|---|---|
| Sodium silicate solution [1] | 79.55 |
| Clay | 9.00 |
| Urea | 5.00 |
| Triethanolamine | 0.15 |
| Water | 6.00 |
| Silicone [2] | 0.05 |

[1] $Na_2O : SiO_2 = 1.0 : 3.3$ (37.3% solids, 40.0° to 41.2° Bé.).
[2] 80 parts amylethoxy polysiloxane–20 parts Igepal CO-530.

EXAMPLE VI

The following is an example of a silicone adhesive emulsion composition of this invention:

| Sodium silicate solution | Percent by wgt. |
|---|---|
| ($1Na_2O:2.5SiO_2$) | Balance to 100%. |
| Urea | 2.5. |
| Water | 0.5. |
| Silicone (F-121 Dow Corning) (100% silicone basis) | 0.07 to 0.1. |
| Triethanolamine | 0.15 to 0.30. |
| Igepal CO-530 | Trace. |

EXAMPLE VII

The following is another example of a silicone adhesive emulsion composition of this invention:

| Sodium silicate solution | Percent by wgt. |
|---|---|
| ($1Na_2O:4.0SiO_2$) | Balance to 100%. |
| Urea | 2.5. |
| Water | 0.5. |
| Silicone (F-121 Dow Corning) (100% silicone basis) | 0.07 to 0.1. |

EXAMPLE VIII

The following adhesive compositions are prepared, the quantities indicated being in terms of percent by weight:

| No. | Sodium Silicate [1] | $H_2O$ | Piccopale N-2 | Clay | Urea | Silicone [2] | Igepal CO-530 | Silicone Solvent |
|---|---|---|---|---|---|---|---|---|
| 1 | 99.79 | | | | | 0.1 | 0.01 | Tetrachlorethylene. |
| 2 | 79.5 | 7.0 | 0.5 | 9.0 | 4.0 | 0.04 | | Do. |
| 3 | 79.5 | 7.0 | 0.5 | 9.0 | 4.0 | 0.04 | | Do. |
| 4 | 79.5 | 7.0 | 0.5 | 9.0 | 4.0 | 0.04 | | Pine Oil. |
| 5 | 93.39 | 1.5 | | | 5.0 | 0.05 | 0.01 | |

[1] $1Na_2O:3.3SiO_2$.
[2] Amylethoxy polysiloxane.

The manner of combining the various ingredients of a silicate adhesive composition of this invention generally is not critical provided thorough mixing is effected and advantageously can be accomplished by the following sequence of steps.

Add the entire predetermined amount of liquid aqueous alkali metal silicate to a mixing vessel. Add water and a wetting agent if used, which wetting agent alternatively can be added directly to the silicate or as a final additive. Agitate the mixture and while agitation is being effected, introduce and disperse the clay; the clay should be wetted thoroughly to prevent adsorption of the silicone. Add the Piccopale resin if employed. Add urea. Add the silicone and wetting agent if employed.

The resulting mixture is then mixed with highly dispersive agitation for a period of about 30 to 90 minutes to insure a uniform stable mixture.

The above compositions are used as adhesives in a double-backer paperboard manufacturing apparatus. It is observed that these mixtures exhibit a high degree of self-release, i.e., substantial nonadhesion to heated metal surfaces.

EXAMPLE IX

Illustrative of corrugator oil-silicone compositions of this invention, mixtures of a paraffin base, petroleum-derived oil and amylethoxy polysiloxane are prepared, and it is shown that heated metal plates coated with corrugated oil containing 1% of the silicone exhibit self-release both to silicone-silicate adhesives and silicate adhesive compositions containing no silicone. Better results are obtained by applying a fine mist of corrugator oil containing about 1% by weight of silicone (amylethoxy polysiloxane) dissolved in the oil.

EXAMPLE X

The following is illustrative of another adhesive composition of this invention:

| Ingredient: | Percent by wgt. |
|---|---|
| Aqueous sodium silicate ($1Na_2O:3.3SiO_2$) | 77.17 |
| Urea | 4.0 |
| Clay | 11.0 |
| Piccopale 100 | 0.75 |
| Silicone[1] | 0.08 |

[1] 50% solution of amylethoxy polysiloxane in pine oil.

EXAMPLE XI

In many instances, better results with respect to emulsion stability are obtained by dissolving the silicone in a liquid Igepal wetting agent. The following is illustrative of such practice.

| Ingredient: | Percent by wgt. |
|---|---|
| Aqueous sodium silicate ($1Na_2O:3.3SiO_2$) | 78.68 |
| Clay | 9.0 |
| Urea | 4.0 |
| Water | 8.0 |
| Piccopale 100 | 0.3 |
| Silicone[1] | 0.05 |

[1] 80 parts amylethoxy polysiloxane dissolved in 20 parts Igepal CO-530.

Using this mixture, it is observed that self-release is obtained from heated metal plates.

EXAMPLE XII

The following is another illustrative composition of this invention.

| Ingredient: | Percent by wgt. |
|---|---|
| Aqueous sodium silicate ($1Na_2O:3.3SiO_2$) | Balance |
| Turkey red oil (sulfonated castor oil) | 0.02 |
| Amyl ethoxy polysiloxane | 0.08 |

EXAMPLE XIII

A further composition of this invention consists of the the following mixture.

| Ingredient: | Percent by wgt. |
|---|---|
| Silicone | 0.04 |
| Water | 8.0 |
| Clay | 9.0 |
| Urea | 4.5 |
| Aqueous sodium silicate ($1Na_2O:3.3SiO_2$) | 78.2 |
| Piccopale 100 | 0.25 |

EXAMPLE XIV

| Ingredient: | Percent by wgt. |
|---|---|
| Clay | 11.0 |
| Urea | 4.5 |
| Water | 8.0 |
| Silicone[1] | 0.05 |
| Silicate ($1Na_2O:3.3SiO_2$) | 76.45 |

[1] 80 parts silicone dissolved in 20 parts Igepal.

EXAMPLE XV

A further adhesive composition of this invention is the following.

| Ingredient: | Percent by wgt. |
|---|---|
| Aqueous sodium silicate ($1Na_2O:3.3SiO_2$) | Balance |
| Urea | 2.5 |
| Water | 0.5 |
| Amylethoxy polysiloxane | 0.08 |
| Igepal CO-530 | 0.02 |

EXAMPLE XVI

Further illustrative of compositions for coating heated metal surfaces in accordance with this invention to provide non-adhesion of adhesive silicate compositions is the following.

| Ingredient: | Percent by wgt. |
|---|---|
| Silicone (XE-23)[1] | 1.0 |
| Aquadag paste | 3.2 |
| Water | 95.8 |

[1] Silicone Division, Union Carbide, aqueous emulsion, 50% silicone.

Applying this coating to metal surfaces at 250° F. and bringing the heated metal surface up to an operating temperature of 330° F. yields a smooth, continuous silicone coating, from which adhesive silicates are self-releasing.

EXAMPLE XVII

A paper board plant test is conducted using as the adhesive composition a urea-silicone emulsion comprising 2.5% urea, 0.1% of an amyl ethoxy polysiloxane solution in Igepal CO-530 (80 parts amylethoxy polysiloxane and 20 parts Igepal), 0.5% water, and 96.9% sodium silicate ($1Na_2O:3.3SiO_2$). A total of 6,478 pounds of this adhesive is used in making 580,000 sq. ft. of various types and widths of paperboard. The adhesive operates satisfactorily on the machines showing fast set and producing good bond. In addition, while complete self-cleaning is not shown in all cases, a singular degree of non-adhesion to the heated metal surface is exhibited, thus demonstrating a significant improvement over an unmodified silicate adhesive.

EXAMPLE XVIII

A series of coating compositions are prepared as follows: (1) 1% amylethoxy polysiloxane dissolved in toluene, (2) 1% of the same amylethoxy polysiloxane dissolved in xylene, (3) 1% of this amylethoxy polysiloxane dissolved in kerosene, (4) 1% of the same amylethoxy polysiloxane dissolved in ethylene dichloride, (5) 1% of the same amylethoxy polysiloxane dissolved in tetrachlorethylene, and (6) 1% of the same amylethoxy polysiloxane dissolved in trichlorethylene. It is found that these mixtures provide self-release for aqueous sodium silicate adhesives applied to pre-coated heated metal platens at temperatures of about 330° F.

EXAMPLE XIX

A further illustrative adhesive composition of this invention is the following.

| Ingredient: | Percent by wgt. |
|---|---|
| Cottonseed oil | 0.25 |
| Silicone[1] | 0.05 |
| Urea | 5.00 |
| Triethanolamine | 0.15 |
| Water | 6.00 |
| Clay | 9.00 |
| Silicate ($1Na_2O:3.3SiO_2$) | 79.55 |

[1] 80 parts amylethoxy polysiloxane dissolved in 20 parts Igepal CO-530.

This composition exhibits excellent self-release from a metal surface at 325° F.

EXAMPLE XX

Further adhesive compositions of this invention are the following:

| | Ingredient | Percent by Wgt. |
|---|---|---|
| (A) | Sodium silicate ($1Na_2O:3.3SiO_2$) | balance |
|  | Monoisoamyl phosphate | 0.5 |
|  | Amylethoxy polysiloxane | 0.05 |
| (B) | Sodium silicate ($1Na_2O:3.3SiO_2$) | balance |
|  | Amylethoxy polysiloxane | 0.1 |
| (C) | Sodium silicate ($1Na_2O:3.3SiO_2$) | balance |
|  | Amylethoxy polysiloxane | 0.5 |
|  | Urea | 2.0 |
| (D) | Sodium silicate ($1Na_2O:3.3SiO_2$) | balance |
|  | Amylethoxy polysiloxane (50% solution in tetrachlorethylene) | 0.2 |
|  | Igepal CO-530 | 0.01 |
| (E) | Sodium silicate ($1Na_2O:3.3SiO_2$) | balance |
|  | Amylethoxy polysiloxane (50% solution in tetrachlorethylene) | 0.10 |
|  | Igepal CO-530 | 0.005 |
|  | Urea | 2.0 |
| (F) | Sodium silicate ($1Na_2O:3.3SiO_2$) | balance |
|  | Amylethoxy polysiloxane (50% solution in tetrachlorethylene) | 0.2 |

These compositions exhibit self-release from heated metal surfaces.

EXAMPLE XXI

A study is made of a series of Igepals as dispersing agents. These materials belong to the group of nonionic wetting agents and are sold by Antara Chemicals. All tried are effective in emulsifying the silicone, but Igepal CO–530 is preferred. A concentration of 0.05% of this material gives stable emulsions, a concentration of 0.01 being preferred. Using this concentration the following mixes are prepared and allowed to standover three weeks with no apparent signs of separation:

(1) Sodium silicate ($1Na_2O:3.3SiO_2$), 0.1% Igepal CO–530, and 0.1% amylethoxy polysiloxane added as 50% perchloroethylene solution.
(2) Sodium silicate ($1Na_2O:3.3SiO_2$), 0.01% Igepal CO–530, 0.05% amylethoxy polysiloxane perchlorethylene solution, and 2% urea.
(3) Sodium silicate ($1Na_2O:3.3SiO_2$), 0.01% Igepal CO–530 and 0.1% amylethoxy polysiloxane.

These three compositions show essentially equivalent clean-up when first prepared, and after three weeks no loss in clean-up is detected. This shows that not only do the emulsions have good stability, but that the silicone is stable to aqueous silicate solutions and does not undergo hydrolysis, or other change, during this time.

It is to be understood that although the invention has been described with specific reference to particular embodiments thereof, it is not to be so limited, since changes and alterations therein may be made which are within the full intended scope of this invention as defined by the appended claims.

What is claimed is:

1. In the preparation of paperboard by adhesively bonding cellulosic materials with an alkali metal silicate adhesive, the improvement which comprises contacting heated metal surfaces coming in contact with such adhesive with a silicone in an amount sufficient to impart anti-adhesive properties to said metal surfaces with respect to said silicate whereby adhesion of said adhesive to said heated metal surfaces is minimized.

2. In the preparation of paperboard by adhesively bonding cellulosic materials with an alkali metal silicate adhesive, the improvement which comprises contacting metal surfaces coming in contact with said adhesive with a silicone-containing composition applied as a separate coating to said surfaces, said silicone being present in an amount sufficient to prevent adhesion of said silicate to said metal surfaces.

3. The improvement as claimed in claim 2 wherein the silicone is applied to the metal surfaces in a composition comprising a major proportion of a lubricating oil and a minor proportion of an oil-soluble silicone, said silicone being present in an amount of about 0.1 to about 10% by weight of said lubricating oil.

4. The improvement as claimed in claim 3 wherein the composition is sprayed on the metal surfaces.

5. The improvement as claimed in claim 1 wherein a polysiloxane stable to aqueous alkaline solutions is incorporated into the adhesive.

6. The improvement as claimed in claim 5 wherein the polysiloxane is incorporated into the adhesive and a paraffin hydrocarbon oil-soluble polysiloxane also is applied directly to the heated metal surfaces.

7. An adhesive composition consisting essentially of, in combination, a major proportion of an aqueous adhesive silicate and a minor proportion of a paraffin-hydrocarbon oil-soluble polysiloxane, the amount of said polysiloxane being no greater than about 1% by weight of said adhesive composition but being at least sufficient to reduce adhesion of said composition to heated metal surfaces.

8. An aqueous adhesive composition comprising, in combination, a major proportion of an aqueous alkali metal silicate, minor but effective proportions of clay, urea, a fatty oil, and a paraffin hydrocarbon oil-soluble polysiloxane stable in the presence of said silicate, the amount of said polysiloxane being no greater than about 1% by weight of said composition but being at least sufficient to minimize adhesion of said composition to heated metal surfaces.

9. An aqueous adhesive composition comprising, in combination, a major proportion of an aqueous alkali metal silicate, minor but effective proportions of clay, urea, an organic wetting agent, and a paraffin hydrocarbon oil-soluble polysiloxane stable in the presence of said silicate, the amount of said polysiloxane being no greater than about 1% by weight of said composition but being at least sufficient to minimize adhesion of said composition to heated metal surfaces.

10. An aqueous adhesive composition comprising, in combination, a major proportion of an aqueous alkali metal silicate, minor but effective proportions of clay, urea, a polymerized petroleum and a paraffin hydrocarbon oil-soluble polysiloxane stable in the presence of said silicate, the amount of said polysiloxane being no greater than about 1% by weight of said composition but being at least sufficient to minimize adhesion of said composition to heated metal surfaces.

11. An aqueous adhesive composition comprising, in combination, a major proportion of an aqueous alkali metal silicate, minor but effective proportions of clay, urea, an alkali metal chromate, and a paraffin hydrocarbon oil-soluble polysiloxane stable in the presence of said silicate, the amount of said polysiloxane being no greater than about 1% by weight of said adhesive composition but being at least sufficient to minimize adhesion of said composition to heated metal surfaces.

12. An aqueous adhesive composition comprising, in combination, a major proportion of an aqueous alkali metal silicate, minor but effective proportions of clay, urea, an alkylolamine, and a paraffin hydrocarbon oil-soluble polysiloxane stable in the presence of said silicate, the amount of said polysiloxane being no greater than about 1% by weight of said composition but being at least sufficient to minimize adhesion of said composition to heated metal surfaces.

13. An aqueous adhesive composition comprising, in combination, a liquid aqueous alkali metal silicate, having an alkali metal oxide:$SiO_2$ ratio within the range of from about 1 to 2.5 to 4.0 and containing about 30 to 50% solids, a minor amount of clay and a lesser amount of urea, a minor amount of a fatty oil and an alkylolamine, and about 0.01% to about 1% of a paraffin hydrocarbon oil-soluble alkyl alkoxypolysiloxane.

14. The composition as claimed in claim 13 wherein the alkyl alkoxypolysiloxane is amylethoxy polysiloxane.

15. An aqueous adhesive composition comprising, in combination, about 70% to 85% by weight of an aqueous sodium silicate containing about 35%–47% solids, and having an $Na_2O:SiO_2$ ratio within the range from about 1:2.5 to 4.0, about 0.01% to 0.1% by weight of an organic wetting agent, about 0.01% to about 1.0% of an oil-soluble silicone, about 2% to 8% by weight of urea, about 5% to 20% by weight of clay, up to about 2% by weight of a petroleum resin and sufficient water to 100%.

16. The composition according to claim 15 wherein a portion of the water is replaced by an alkali metal chromate in the amount of 0 to 1% by weight.

17. In the manufacture of paperboard, the improvement which comprises spraying on the heated metal surfaces of the paperboard manufacturing apparatus a paraffin base lubricating oil containing a small amount of a dissolved silicone sufficient to preclude adhesion of the paperboard adhesive to the heated metal surfaces.

18. The improvement as claimed in claim 17 wherein the paraffin lubricating oil containing the dissolved silicone is misted on a single facer.

19. An aqueous adhesive composition comprising, in combination, a major proportion of an aqueous alkali metal silicate, minor but effective proportions of urea, a wetting agent and a silicone stable in the presence of said silicate, the amount of said silicone being no greater than about 1% by weight of said composition but being at least sufficient to provide release of said composition from heated metal surfaces.

20. A composition of matter consisting essentially of a major proportion of a paraffin hydrocarbon oil and a minor proportion of a polysiloxane dissolved therein, said polysiloxane being present in an amount sufficient to reduce adhesion of alkali metal silicates contacting surfaces covered by said composition, said amount being at least 0.1% by weight of the composition.

21. The composition as claimed in claim 20 wherein the polysiloxane is an alkyl alkoxypolysiloxane.

22. The composition as claimed in claim 21 wherein the alkyl alkoxypolysiloxane is an amylethoxy polysiloxane.

23. A method of decreasing adhesion of alkali metal silicates to heated metal surfaces which comprises applying to said surfaces a liquid coating containing as the active anti-adhesive ingredient a paraffin hydrocarbon oil-soluble polysiloxane in an amount of about 0.1 to about 10% by weight.

24. A composition of matter consisting essentially of a paraffin hydrocarbon oil and from about 0.1% to 10% of a normally liquid polysiloxane having the structure

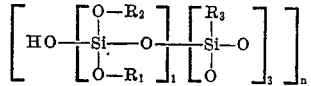

wherein $R_1$, $R_2$ and $R_3$ are lower alkyl radicals and $n$ is a number sufficient to provide an average molecular weight of about 3000.

25. The composition as claimed in claim 24 wherein $R_1$ and $R_2$ are ethyl radicals and $R_3$ is an amyl radical.

26. An aqueous adhesive composition comprising, in combination, about 70% to 85% of an aqueous sodium silicate having a $Na_2O:SiO_2$ ratio within the range from about $1Na_2O:3.3$ to $3.5SiO_2$, about 3% to 6% urea, about 0.04% to 0.1% of a solution of a paraffin hydrocarbon oil-soluble polysiloxane in a liquid organic wetting agent, about 0.25 to 0.75% petroleum resin, about 8% to 14% clay, and about 5% to 8% added water.

References Cited in the file of this patent
UNITED STATES PATENTS

| | | |
|---|---|---|
| 1,796,541 | Schoo | Mar. 17, 1931 |
| 2,330,837 | Mullen | Oct. 5, 1943 |
| 2,347,419 | Lander | Apr. 25, 1944 |
| 2,462,242 | Webb et al. | Feb. 22, 1949 |
| 2,494,329 | Carlin | Jan. 10, 1950 |
| 2,527,793 | Bump et al. | Oct. 31, 1950 |
| 2,554,035 | Kreyling | May 22, 1951 |
| 2,557,011 | Shields | June 12, 1951 |
| 2,572,716 | George | Oct. 23, 1951 |
| 2,588,828 | Greiner | Mar. 11, 1952 |
| 2,591,383 | Spalding | Apr. 1, 1952 |
| 2,601,284 | Hemming et al. | June 24, 1952 |
| 2,609,316 | Fichtner | Sept. 2, 1952 |
| 2,624,749 | Bunnell | Jan. 6, 1953 |
| 2,671,747 | Lander | Mar. 9, 1954 |
| 2,752,638 | Anspon | July 3, 1956 |
| 2,762,785 | Cooper | Sept. 11, 1956 |
| 2,802,850 | Wetzel | Aug. 13, 1957 |
| 2,834,744 | Lander | May 13, 1958 |

FOREIGN PATENTS

| | | |
|---|---|---|
| 146,103 | Australia | Apr. 18, 1952 |